United States Patent
Kudo et al.

(10) Patent No.: US 9,070,389 B2
(45) Date of Patent: Jun. 30, 2015

(54) MAGNETIC RECORDING AND REPRODUCING APPARATUS

(71) Applicant: Kabushiki Kaisha Toshiba, Minato-ku (JP)

(72) Inventors: Kiwamu Kudo, Kamakura (JP); Tazumi Nagasawa, Yokohama (JP); Hirofumi Suto, Tokyo (JP); Tao Yang, Yokohama (JP); Koichi Mizushima, Kamakura (JP); Rie Sato, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/314,429

(22) Filed: Jun. 25, 2014

(65) Prior Publication Data

US 2014/0376129 A1 Dec. 25, 2014

(30) Foreign Application Priority Data

Jun. 25, 2013 (JP) .................................. 2013-132877

(51) Int. Cl.
*G11B 5/39* (2006.01)
*G11B 5/35* (2006.01)
*G11B 5/10* (2006.01)

(52) U.S. Cl.
CPC ... *G11B 5/35* (2013.01); *G11B 5/10* (2013.01)

(58) Field of Classification Search
CPC .. G11B 2005/0024; G11B 5/314; G11B 5/02; G11B 5/3146; G11B 2005/3996; G11B 5/23; G11B 5/35; G11B 5/3906; G11B 5/39
USPC ....................................... 360/125.3, 128, 313
See application file for complete search history.

(56) References Cited

U.S. PATENT DOCUMENTS 7,602,588 B2 10/2009 Sato et al.
7,667,933 B2 2/2010 Kudo et al.
(Continued)

FOREIGN PATENT DOCUMENTS

| JP | 2006-286855 | 10/2006 |
|---|---|---|
| JP | 4098786 | 6/2008 |
| WO | WO 2010053187 A1 * | 5/2010 |

OTHER PUBLICATIONS

S.I. Kiselev et al. "Microwave oscillations of a nanomagnet driven by a spin-polarized current", Letters to Nature, 2003, 4 pages.
(Continued)

*Primary Examiner* — Will J Klimowicz
(74) *Attorney, Agent, or Firm* — Oblon, McClelland, Maier & Neustadt, L.L.P.

(57) ABSTRACT

According to an embodiment, a magnetic recording and reproducing apparatus includes a recording medium and a reproducing head. The recording medium includes a concentric circular plurality of tracks. The reproducing head includes a spin torque oscillator and reproduces information from the recording medium using the spin torque oscillator, the spin torque oscillator including an oscillation layer with a first cross-track direction width, a polarizer layer with a second cross-track direction width, and a spacer layer provided between the oscillation layer and the polarizer layer. The first cross-track direction width is larger than double the second cross-track direction width, and the second cross-track direction width is smaller than an inter-track distance.

13 Claims, 8 Drawing Sheets

(56) References Cited

U.S. PATENT DOCUMENTS

| | | |
|---|---|---|
| 7,826,160 B2 | 11/2010 | Sato et al. |
| 8,305,711 B2* | 11/2012 | Li et al. .................... 360/125.31 |
| 8,520,338 B2* | 8/2013 | Udo et al. ..................... 360/128 |
| 8,724,260 B2* | 5/2014 | Igarashi et al. ............ 360/125.3 |
| 8,854,768 B2* | 10/2014 | Sugiura et al. ............. 360/125.3 |
| 2011/0216436 A1* | 9/2011 | Igarashi et al. ................. 360/61 |
| 2013/0050875 A1* | 2/2013 | Yamada et al. ............ 360/125.3 |

OTHER PUBLICATIONS

W.H. Rippard et al. "Direct-Current Induced Dynamics in $Co_{90}Fe_{10}/Ni_{80}Fe_{20}$ Point Contacts", Physical Review Letters, vol. 92, No. 2, 2004, 4 pages.

C. Boone et al. "Experimental test of an analytical theory of spin-torque-oscillator dynamics", Physical Review B 79, 2009, 4 pages.

* cited by examiner

MAGNETIC RECORDING AND REPRODUCING APPARATUS

CROSS REFERENCE TO RELATED APPLICATIONS

This application is based upon and claims the benefit of priority from Japanese Patent Application No. 2013-132877, filed Jun. 25, 2013, the entire contents of which are incorporated herein by reference.

FIELD

Embodiments described herein relate generally to a magnetic recording and reproducing apparatus including a spin torque oscillator reproducing head.

BACKGROUND

A technique using a spin torque oscillator in a reproducing head of a magnetic recording and reproducing apparatus such as a hard disk drive (HDD) has been proposed. The spin torque oscillator reproducing head using the spin torque oscillator is considered to be able to avoid the problem of magnoise which is beginning to be a problem in the conventional HDD reproducing heads. In the spin torque oscillator reproducing head, magnoise is suppressed more as the oscillation of the spin torque oscillator becomes stabler, and a reproduction signal having a higher SN ratio (signal-to-noise ratio) can be obtained. As an issue on the spin torque oscillator reproducing head from a practical point of view, it is considered to be required to increase further the SN ratio of a reproduction signal by suppressing the medium noise such as the inter-track interference and inter-bit interference.

The processed shapes of the spin torque oscillator are roughly classified into two types: a pillar type and nanocontact type. The pillar type spin torque oscillator has a shape obtained by processing a multilayered magnetic film formed by an oscillation layer, spacer layer, and polarizer layer into a submicron-order pillar shape. On the other hand, the nanocontact type spin torque oscillator has a shape obtained by processing a contact electrode for supplying an electric current into a size on the submicron order without processing a multilayered magnetic film into any specific shape. The nanocontact type spin torque oscillator is considered to be able to obtain oscillation stabler than that of the pillar type spin torque oscillator. For example, it has been reported that oscillation having a high Q value of 18,000 can be achieved in a nanocontact type spin torque oscillator under an appropriate magnetic field environment. In the nanocontact type spin torque oscillator, the oscillation layer is not processed, so there is little processing damage at the side surfaces of the oscillation layer. This is considered the main reason why stable oscillations are obtained in nanocontact type spin-torque oscillators. From the fact, it is considered that decreasing processing damage in the oscillation layer results in stable oscillations.

For the implementation of the spin torque oscillator reproducing head, the stable oscillation of the spin torque oscillation and the suppression of the medium noise are required.

DETAILED DESCRIPTION

According to an embodiment, a magnetic recording and reproducing apparatus includes a recording medium and a spin torque oscillator reproducing head. The recording medium includes a plurality of concentric circular tracks. The spin torque oscillator reproducing head includes a spin torque oscillator and reproduces information from the recording medium using the spin torque oscillator. The spin torque oscillator includes an oscillation layer with a first cross-track direction width, a polarizer layer with a second cross-track direction width, and a spacer layer provided between the oscillation layer and the polarizer layer. The first cross-track direction width is larger than double the second cross-track direction width, and the second cross-track direction width is smaller than an inter-track distance.

Various embodiments will be described hereinafter with reference to the accompanying drawings. In the following description, an example in which a magnetic recording and reproducing apparatus according to an embodiment is applied to a hard disk drive (HDD) will be explained. In the embodiments, like reference numbers denote like elements, and a repetitive explanation will be omitted.

First Embodiment

Figure 1:
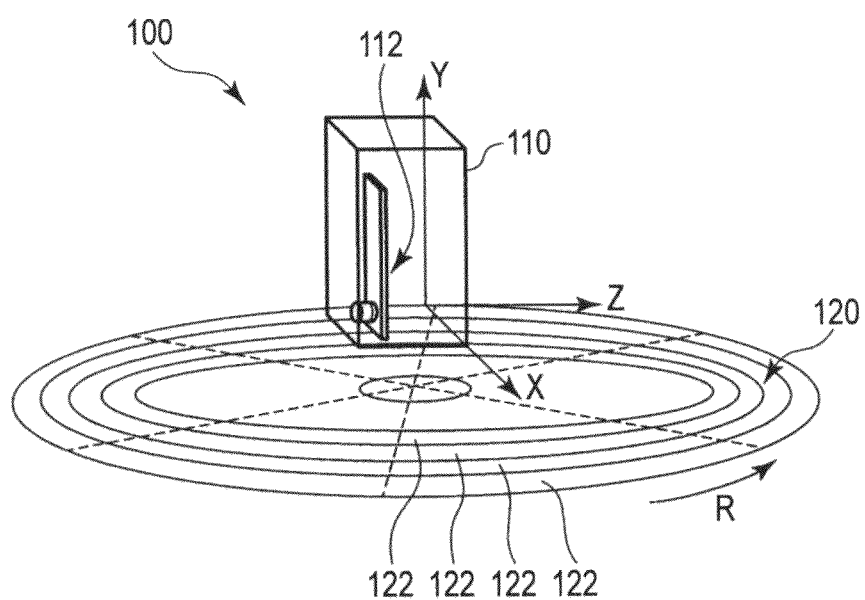
FIG. 1 is a perspective view schematically showing a magnetic recording and reproducing apparatus according to the first embodiment.

FIG. 1 schematically shows a magnetic recording and reproducing apparatus 100 according to the first embodiment.

As shown in FIG. 1, the magnetic recording and reproducing apparatus 100 includes a spin torque oscillator reproducing head 110 and recording medium 120.

The spin torque oscillator reproducing head 110 is used to reproduce magnetic information recorded on the recording medium 120. More specifically, the spin torque oscillator reproducing head 110 includes a spin torque oscillator (STO) 112 as a magnetic sensor for sensing a magnetic field generated from the recording medium 120. The spin torque oscillator reproducing head will be referred to as an STO reproducing head hereinafter. The STO reproducing head 110 is attached to the distal end portion of an actuator arm (not shown). When reproducing information, the actuator arm is driven so that the STO reproducing head 110 is held above the surface of the recording medium 120 with a floating amount.

In this embodiment, the recording medium 120 is a magnetic disk. A plurality of concentric circular tracks 122 are formed in the recording medium 120. Recording bits are arranged at equal intervals on each track 122. The intervals at which the recording bits are arranged need to be equal only in the same track, and can be different in different tracks. When reproducing information, the recording medium 120 is rotated in the direction of an arrow R (or in the opposite direction) by a rotating mechanism (not shown). Consequently, the STO reproducing head 110 moves relative to the recording medium 120.

For the convenience of explanation, an XYZ orthogonal coordinate system fixed in the STO reproducing head 110 is defined as shown in FIG. 1. The X direction represents a cross-track direction, i.e., the radial direction of the recording medium 120 (more specifically, the concentric circular tracks 122), the Y direction represents a direction perpendicular to the recording surface of the recording medium 120, and the Z direction represents a down-track direction, i.e., a direction in which the spin torque oscillator 112 moves relative to the recording medium 120. The down-track direction will be referred to as a bit direction hereinafter.

Figure 2:
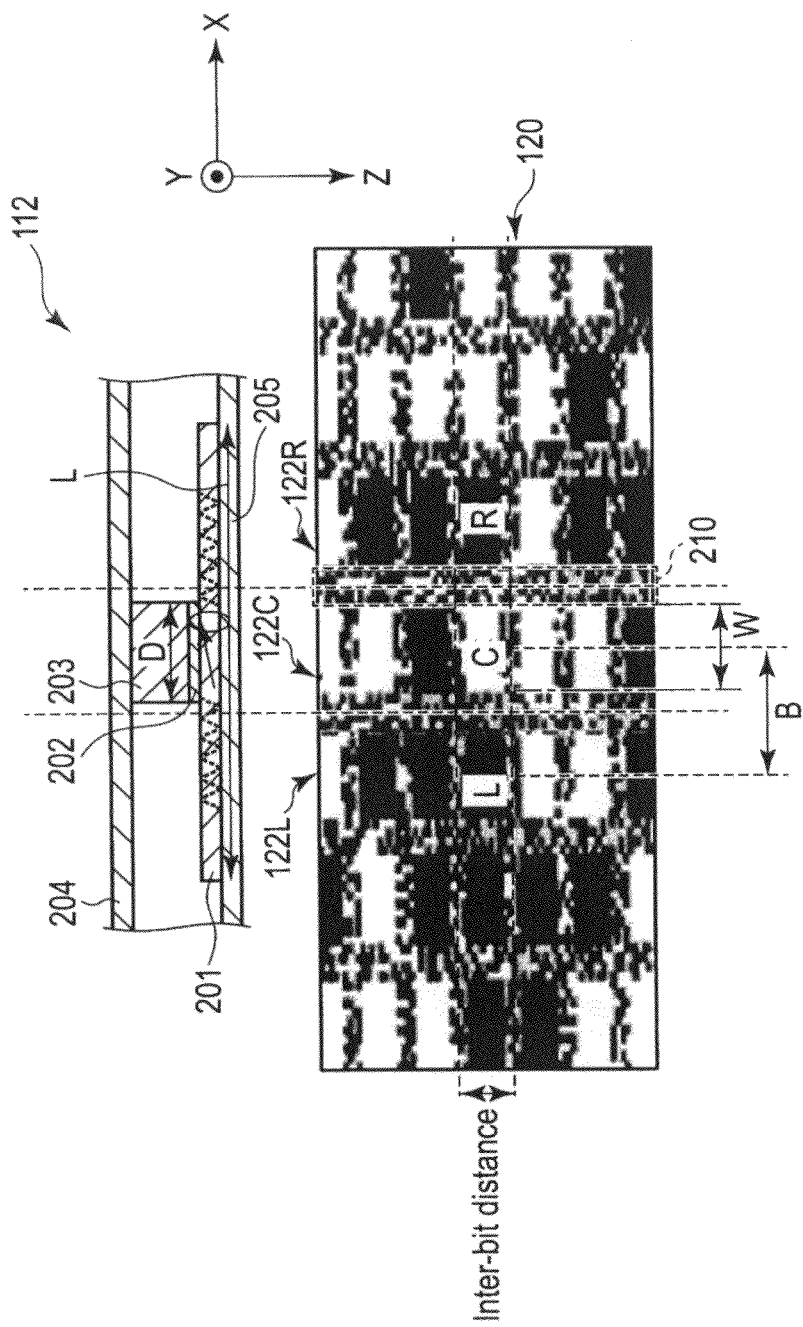
FIG. 2 is a view schematically showing the arrangements of a spin torque oscillator and recording medium shown in FIG. 1.

FIG. 2 schematically shows the spin torque oscillator 112. As shown in FIG. 2, the spin torque oscillator 112 includes an oscillation layer 201, spacer layer 202, polarizer layer 203, cap layer 204, and foundation layer 205. The oscillation layer 201 is stacked on the foundation layer 205, the spacer layer 202 is stacked on the oscillation layer 201, the polarizer layer 203 is stacked on the spacer layer 202, and the cap layer 204 is stacked on the polarizer layer 203. The direction in which the foundation layer 205, oscillation layer 201, spacer layer 202, polarizer layer 203, and cap layer 204 are stacked will be referred to as a stacking direction hereinafter. When reproducing information, the STO reproducing head 110 is located opposite to the recording medium 120 such that the stacking direction almost matches the bit direction. Referring to FIG. 2, it is assumed that information recorded on a track 122C including a recording bit C is to be reproduced. A track as a target of information reproduction will be referred to as a target track hereinafter. In FIG. 2, a portion of the recording medium 120 and the X-Z section of the spin torque oscillator 112 are vertically arranged for the sake of explanation. When reproducing information, however, the spin torque oscillator 112 relatively moves in the bit direction over the target track (e.g., the track 122C), and detects a medium magnetic field from a recording bit positioned immediately below the spin torque oscillator 112.

The spin torque oscillator 112 oscillates when a direct current is supplied via a pair of electrodes. The predetermined direct current is a direct current having a current density higher than a threshold current density. More specifically, when a direct current is supplied to the spin torque oscillator 112, the polarizer layer 203 polarizes the electrons' spins in the direct current. The spin-polarized current causes a spin torque to act on magnetization in the oscillation layer 201. Consequently, the magnetization of the oscillation layer 201 steadily oscillates. In this embodiment, the polarizer layer 203 is a free layer whose magnetization can move, and the magnetization of the polarizer layer 203 also steadily oscillates when a direct current is supplied. Note that the polarizer layer 203 may be a pinned layer whose magnetization is pinned.

This magnetization oscillation is converted into a high-frequency output by the magnetoresistive (MR) effect. More specifically, the magnetoresistive effect generates an AC component in the voltage across the electrodes, and a high-frequency circuit (not shown) extracts this AC component of the voltage. The frequency of the high-frequency output depends on, e.g., the size and thickness of the oscillation layer 201, the magnitude of the direct current, and the intensity of an external magnetic field. Since the frequency of the high-frequency output depends on an external magnetic field, the frequency also depends on a magnetic field from a recording bit of the recording medium 120. Accordingly, the magnetization direction of a recording bit can be detected by measuring the frequency (or phase) of the high-frequency output as a reproduction signal.

As an example, the recording medium 120 is a perpendicular magnetic recording medium. Each recording bit of the recording medium 120 holds information corresponding to the magnetization direction thereof. For example, a recording bit in which the magnetization direction is upward (the +Y direction) holds information "0", and a recording bit in which the magnetization direction is downward (the -Y direction) holds information "1". In addition, a recording bit generates a medium magnetic field corresponding to the magnetization direction thereof. The STO reproducing head 110 can reproduce information held in a recording bit by detecting the medium magnetic field from the recording bit, which acts on the spin torque oscillator 112.

The reproducing operation by the STO reproducing head 110 is performed while the spin torque oscillator 112 is oscillating. That is, while the spin torque oscillator 112 is oscillating, the STO reproducing head 110 detects magnetic fields from recording bits one after another, moving relative to the recording medium 120 in the bit direction. The magnetic field is detected by measuring the change in frequency or phase of the high-frequency output.

The oscillation layer 201 has a cross-track direction width L. The polarizer layer 203 has a cross-track direction width D. The polarizer layer 203 is patterned into a pillar shape such as a circular pillar shape, an elliptical pillar shape, or a square pillar shape having rounded corners. The cross-track direction width D denotes the maximum value of the cross-track direction width of the polarizer layer 203. For example, when the polarizer layer 203 is a circular pillar having a radius R, the cross-track direction width D is twice the radius R. The cross-track direction width is the dimension in the cross-track direction in a state in which the spin torque oscillator 112 is located opposite to the recording medium 120 in order to reproduce information. The spin torque oscillator 112 is designed and processed such that the cross-track direction widths L and D satisfy inequality (1) below. According to inequality (1), the cross-track direction width L is larger than double the cross-track direction width D:

$$L > 2D \tag{1}$$

Inequality (1) represents a condition under which magnetization dynamics excited in the oscillation layer 201 by spin torque is almost unaffected by processing damage to the side surfaces of the oscillation layer 201. When inequality (1) is satisfied, it is possible to achieve stable oscillation by avoiding the influence of processing damage to the oscillation layer 201. The reason why the magnetization dynamics excited in the oscillation layer 201 is almost unaffected by processing damage to the side surfaces of the oscillation layer 201 when inequality (1) is satisfied will be described later.

When inequality (1) is satisfied, the processed shape of the multilayered magnetic film including the oscillation layer 201, spacer layer 202, and polarizer layer 203 can be called a half-pillar shape because the multilayered film is not fully formed into a pillar shape. The spacer layer 202 is patterned like the polarizer layer 203 in the example shown in FIG. 2, but this is not essential for the shape called a half-pillar shape. The shape is called a half-pillar shape because the polarizer layer 203 is processed into a pillar shape. The shape of the spacer layer 202 is the same as that of the polarizer layer 203. Alternatively, the shape of the spacer layer 202 may be a shape gradually narrowed toward the polarizer layer 203, and the shape of the polarizer layer 203 may be a shape gradually narrowed toward the cap layer 204.

A recording head (not shown) performs magnetic recording on the recording medium 120 such that the track width is W. FIG. 2 exemplarily shows a granular medium as an example of the recording medium 120. In this case, magnetization transition occurs in an inter-track region 210. The recording medium 120 may be a so-called discrete-track medium or bit-patterned medium. In this case, the inter-track region 210 is processed, e.g., a nonmagnetic material is buried in it. In the magnetic recording and reproducing apparatus 100, the cross-track direction width D of the polarizer layer 203 and an inter-track distance B satisfy inequality (2) below. The inter-track distance indicates a distance between the center of a recording bit (or a track) and the center of a recording bit (or a track) adjacent to the former recording bit (or the former track) in the cross-track direction, i.e., a distance between dotted lines as shown in FIG. 2. The inter-track distance can be evaluated by, e.g., analyzing a magnetic image by using a magnetic force microscope (MFM). According to inequality (2), the cross-track direction width D is smaller than the inter-track distance B:

$$D<B \quad (2)$$

Inequality (2) represents a condition under which the medium noise is suppressed by reducing interference acting on the polarizer layer 203 from non-target tracks. The non-target tracks are tracks (e.g., tracks 122L and 122R) adjacent to a target track (e.g., the track 122C) in the cross-track direction. To explain this condition, a condition opposite to this condition, i.e., a phenomenon in which the medium noise often deteriorates a reproduction signal when D>B will be explained. Assume that the recording bit C shown in FIG. 2 is to be reproduced. Recording bits L and R are adjacent to the recording bit C in the cross-track direction. When D>B, the polarizer layer 203 faces not only a target track but also adjacent tracks outside the target track, so magnetic fields from the adjacent recording bits L and R also act on the polarizer layer 203. Consequently, magnetization p of the polarizer layer 203 fluctuates under the influence of the recording bits L and R. A Slonczewski type spin torque that excites magnetization m of the oscillation layer 201 is proportional to $\sigma Im \times (m \times p)$ where $\sigma$ indicates the spin transfer efficiency, and I indicates an electric current to be supplied to the spin torque oscillator 112. Accordingly, the fluctuation in magnetization p caused by the magnetic fields from the adjacent recording bits L and R is converted into the fluctuation in magnetization m through spin torque $\sigma Im \times (m \times p)$. The fluctuation in magnetization m is nothing but the fluctuation in oscillation, and deteriorates a reproduction signal from the spin torque oscillator 112. Thus, the condition of inequality (2) is a condition for suppressing the influence of the fluctuation caused in the magnetization p of the polarizer layer 203 by non-target tracks on the oscillation of the magnetization m through the spin torque.

Next, the condition indicated by inequality (1) will be explained.

Figure 3A:
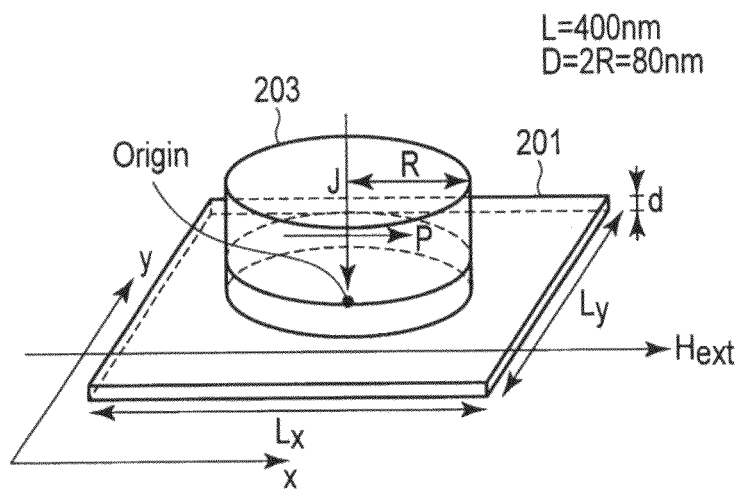
FIG. 3A is a view schematically showing a spin torque oscillator used in simulation for explaining condition L>2D.
Figure 3B:
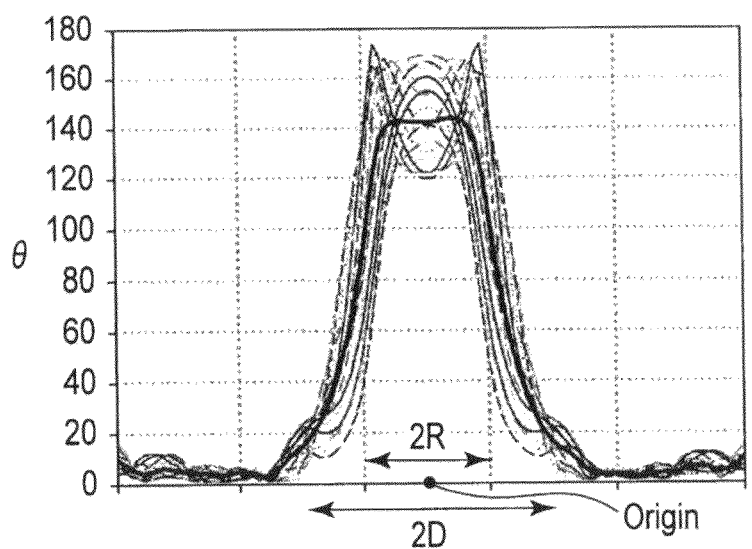
FIG. 3B is a graph showing the simulation result.

When L>2D, the magnetization dynamics excited by the oscillation layer 201 is almost unaffected by the processing damage to the side surfaces of the oscillation layer 201. This will be explained with reference to FIGS. 3A and 3B. FIG. 3A shows the shape of a multilayered magnetic film as the setting of micromagnetic simulation of the magnetization dynamics of the oscillation layer 201 performed by the inventors. FIG. 3B shows the result of the micromagnetic simulation. In the simulation, as shown in FIG. 3A, the oscillation layer 201 is a rectangular parallelepiped having a length Lx of 400 nm in the X direction, a length Ly of 400 nm in the Y direction, and a film thickness (defined in the Z direction) d of 3 nm, and the polarizer layer 203 is a circular pillar having a radius R of 40 nm. A saturation magnetization of 800 emu/cm$^3$, an exchange stiffness coefficient of $1 \times 10^{-6}$ erg/cm, a crystal uniaxial anisotropy of 1000 erg/cm$^3$ in the X direction, a Gilbert damping coefficient of 0.02, and in-plane external magnetic field $H_{ext}$=1000 Oe in the x direction are used as magnetic parameters of the oscillation layer 201, and the magnetization dynamics is calculated under conditions supplying a current with current density J=I/$\pi R^2$.

FIG. 3B shows the calculation result when the current density is $6 \times 10^8$ A/cm$^2$. The spatial distribution of the magnetization of the oscillation layer is represented by the spatial distribution of an elevation angle $\theta$ from the xy plane. Referring to FIG. 3B, the dotted lines represent the temporal-spatial dependence of oscillation for one period, and the thick line represents the one-period average of the spatial distribution. FIG. 3B reveals that a large-amplitude magnetization dynamics locally exists around the origin and falls within the range of a width 2D (in this example, 160 nm). When L>2D, therefore, the large-amplitude magnetization dynamics excited in the oscillation layer 201 is almost unaffected by the cross-track direction width L of the oscillation layer 201. Simulations are also performed for L=180, 240, and 280 nm, and it is confirmed by the simulations that almost the same magnetization dynamics as that when L=400 nm appears. That is, when L>2D, the same magnetization dynamics is excited regardless of the shape of the oscillation layer 201. This means that when L>2D, the magnetization dynamics excited in the oscillation layer 201 is unaffected by the processing damage to the side surfaces of the oscillation layer 201.

As described above, the magnetic recording and reproducing apparatus according to the first embodiment includes the spin torque oscillator processed such that the cross-track direction width of the oscillation layer is larger than double the cross-track direction width of the polarizer layer, and the cross-track direction width of the polarizer layer is smaller than the inter-track distance. This makes it possible to obtain stable oscillation, and reduces the medium noise. As a consequence, the SN ratio of a reproduction signal can be increased.

Second Embodiment

In the second embodiment, the structure of the STO reproducing head will be explained more specifically.

Figure 4:
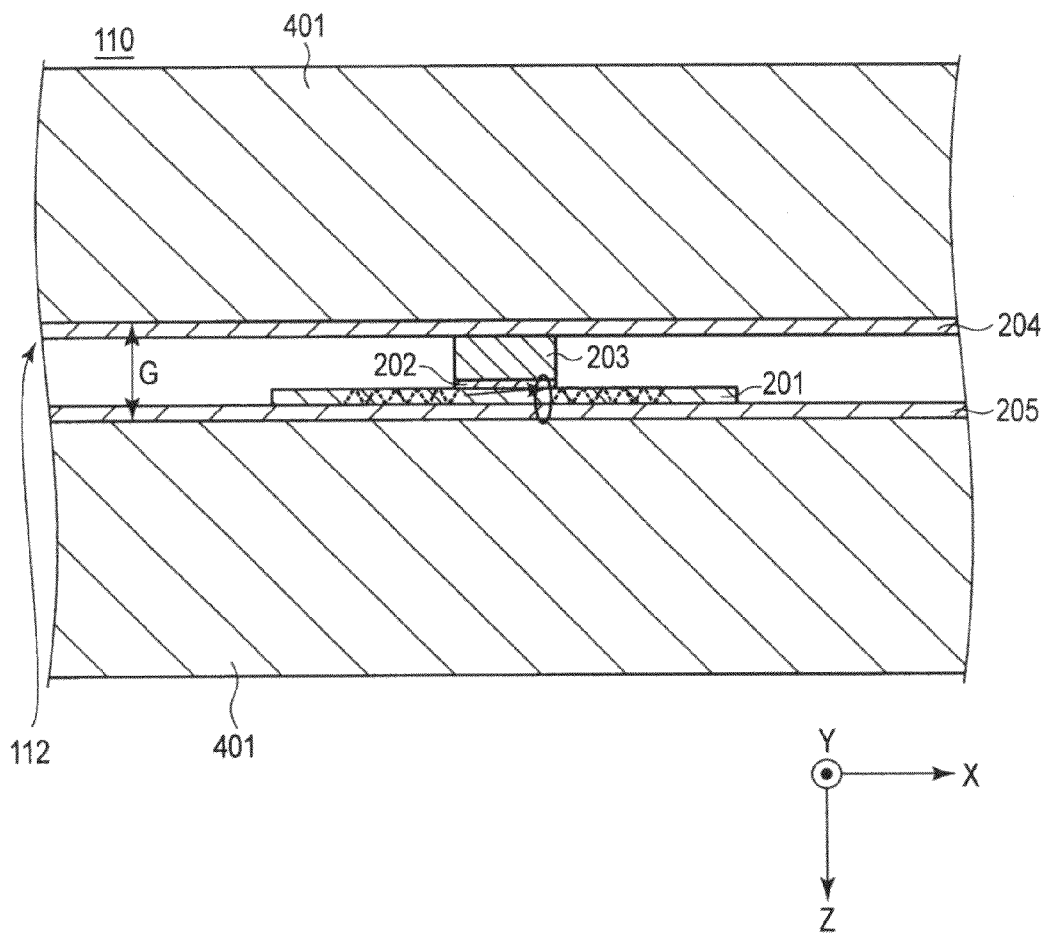
FIG. 4 is a sectional view schematically showing a spin torque oscillator reproducing head according to the second embodiment.

FIG. 4 schematically shows an STO reproducing head 110 mounted on a magnetic recording and reproducing apparatus according to the second embodiment. As shown in FIG. 4, the STO reproducing head 110 includes a spin torque oscillator 112 and a pair of shield layers 401. The shield layers 401 are opposed to each other in the stacking direction. The spin torque oscillator 112 is arranged between the shield layers 401. To reduce inter-bit interference, a gap G between the shield layers 401 is so designed as to be equal to or smaller than the inter-bit distance shown in FIG. 2. The inter-bit distance indicates an interval at which recording bits are arranged on a track. The gap G corresponds to the thickness of the spin torque oscillator 112, i.e., the total thickness of an oscillation layer 201, spacer layer 202, polarizer layer 203, cap layer 204, and foundation layer 205. As the material of the shield layers 401, a high magnetic permeability material such as permalloy can be used.

The shield layers 401 absorb magnetic fields generated from recording bits adjacent to a target recording bit (e.g., a recording bit C) in the bit direction, so that most of a magnetic field acting on the spin torque oscillator 112 is the magnetic field generated from the target recording bit. That is, the shield layers 401 function as magnetic shields for preventing magnetic fields generated by adjacent recording bits from acting on the spin torque oscillator 112. When the gap G is equal to or smaller than the inter-bit distance, it is possible to reduce the influence of adjacent recording bits in the bit direction on a multilayered magnetic film formed by the oscillation layer 201, spacer layer 202, and polarizer 203 in the spin torque oscillator 112, and to reduce the medium noise caused by the inter-bit interference.

The shield layers 401 can also work as a pair of electrodes for supplying a direct current to the spin torque oscillator 112 in a direction perpendicular to the film plane. In this embodiment, a plane perpendicular to the stacking direction of the oscillation layer 201, spacer layer 202, and polarizer layer 203 will be referred to as a film plane.

According to prediction regarding the HDD technologies, it is expected that if the present technologies are extended, the inter-bit distance of recording bits will become about 20 nm for a 2 Tbit/in$^2$ generation, and about 14 nm for a 5 Tbit/in$^2$ generation, as the recording density increases. If recording bits are arranged in accordance with this prediction, G<20 nm is necessary for the 2 Tbit/in$^2$ generation, and G<14 nm is necessary for the 5 Tbit/in$^2$ generation. A conventional magnetoresistance (MR) element reproducing head including a MR effect element such as a GMR (Giant MagnetoResistance effect) element or TMR (Tunnel MagnetoResistance effect) element includes magnetic shields. If the present technologies are extended, a gap distance of G<20 nm is required for the 2 Tbit/in$^2$ generation, and a gap distance of G<14 nm is required for the 5 Tbit/in$^2$ generation, in the MR element reproducing head technologies.

These requirements for the gap distance are considered very difficult problems for the MR element reproducing head technologies. In the MR element for the present MR element reproducing head, a pinned layer that is pinned by an antiferromagnetic layer such as IrMn is indispensable for a reproducing operation, and the pinned effect induced by such an antiferromagnetic layer appears when the thickness of the antiferromagnetic layer is larger than about 7 nm. When the thicknesses of the free layer, spacer layer, pinned layer, and antiferromagnetic layer are respectively set to 3, 1, 5, and 7 nm, for example, as typical numerical values close to the MR element for the present MR element reproducing head, the total thickness is 16 nm, and it is barely possible or impossible to achieve G<20 nm when the cap layer and foundation layer are included. Therefore, it is probably difficult for the conventional MR element reproducing head to achieve a gap distance of G<14 nm that is required for the 5 Tbit/in$^2$ generation.

On the other hand, it is perhaps possible for the STO reproducing head technologies to achieve the requirements for the gap distance, i.e., G<20 nm for the 2 Tbit/in$^2$ generation and G<14 nm for the 5 Tbit/in$^2$ generation. This is so because no pinned layer need be formed in the spin torque oscillator. That is, a pinning layer such as an antiferromagnetic layer need not be formed. The polarizer layer 203 according to this embodiment is a layer to supply a spin-polarized electric current to the oscillation layer 201, so magnetization p of the polarizer layer 203 need not be pinned. The oscillation modes of the spin torque oscillator 112 includes an oscillation mode in which the magnetization p of the polarizer layer 203 coherently oscillates by a spin torque interaction or dipole interaction with magnetization m of the oscillation layer 201.

In this embodiment, an antiferromagnetic layer such as IrMn for pinning is not always necessary because the polarizer layer 203 is formed as a free layer, so the thickness of the spin torque oscillator 112 can be decreased. Since this makes it possible to decrease the gap G between the shield layers 401, the inter-bit interference can be reduced even when using a recording medium having a small inter-bit distance (i.e., having a high recording density).

The spin torque oscillator in which the polarizer layer 203 is a free layer can be configured by combinations of magnetization films as will be explained below.

First Structure Example

Figure 5:
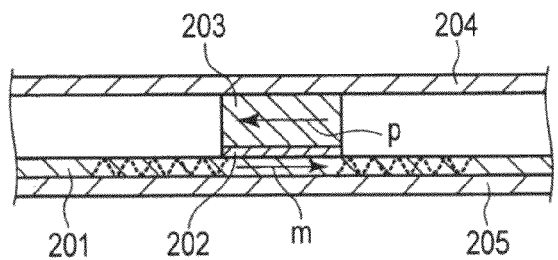
FIG. 5 is a sectional view showing a spin torque oscillator according to an embodiment in which an oscillation layer and polarizer layer are in-plane oscillation films.

FIG. 5 schematically shows the first structure example of the spin torque oscillator 112. In the first structure example, as shown in FIG. 5, both the oscillation layer 201 and polarizer layer 203 are in-plane magnetization films. As the material of the oscillation layer 201 and polarizer layer 203, it is possible to use Co (cobalt), Ni (nickel), Fe (iron), and alloys containing at least one of them, e.g., FeNi (permalloy), CoFe, CoFeB, and a Heusler alloy such as $Co_2FeAl_xSi_{1-x}$.

As the material of the spacer layer 202, it is possible to use a nonmagnetic metal such as Cu (copper), Ag (silver), or Ru (ruthenium), or an insulator such as MgO (magnesium oxide), ZnO (zinc oxide), or AlO (aluminum oxide). As the material of the foundation layer 205 and cap layer 204, it is possible to use a nonmagnetic metal such as Ti (titanium), Cr (chromium), Cu, Au (gold), Ta (tantalum), or Ru, a titanium alloy, or a chromium alloy.

As an example, the spin torque oscillator 112 has a film structure in which the foundation layer 205 is a 2-nm thick Ta layer, the oscillation layer 201 is a 3-nm thick CoFe layer, the spacer layer 202 is a 0.86-nm thick MgO layer, the polarizer layer 203 is a 2-nm thick CoFeB layer, and the cap layer 204 is a 2-nm thick Ta layer. In this embodiment, a film structure like this will be represented as Ta(2)/CoFe(3)/MgO(0.86)/CoFeB(2)/Ta(2). Each numerical value in parentheses indicates the thickness, and the unit is nm. In this example, the gap G is 9.86 nm. In this case, in a magnetic recording and reproducing apparatus including the recording medium 120 having an inter-bit distance of 9.86 nm or more, it is possible to reduce the influence of adjacent recording bits in the bit direction on the spin torque oscillator 112, and reduce the medium noise generated by the inter-bit interference.

Figure 6:
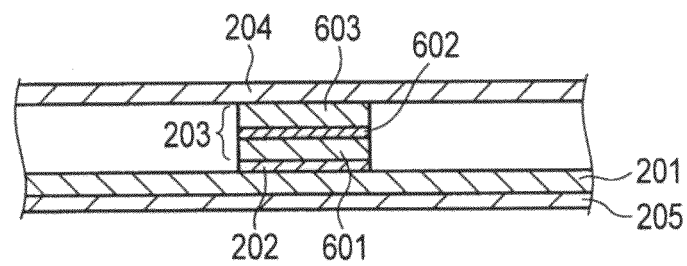
FIG. 6 is a sectional view showing a spin torque oscillator according to an embodiment in which an oscillation layer is a synthetic ferrimagnetic film.

As shown in FIG. 6, the polarizer layer 203 may be an in-plane synthetic ferrimagnetic (SyF) film formed by a first ferromagnetic layer 601, a nonmagnetic spacer layer 602 stacked on the first ferromagnetic layer 601, and a second ferromagnetic layer 603 stacked on the nonmagnetic spacer layer 602, or a synthetic antiferromagnetic film. As the material of the first ferromagnetic layer 601 and second ferromagnetic layer 603, it is possible to use Co, Ni, Fe, and alloys containing at least one of them such as FeNi, CoFe, and CoFeB. As the material of the nonmagnetic spacer layer 602, it is possible to use a nonmagnetic metal that causes antiferromagnetic coupling between the ferromagnetic films when placed between them, e.g., Cr, Ru, or Mo (molybdenum). As an example, the polarizer layer 203 has a film structure of CoFe(2.6)/Ru(0.9)/CoFeB(2). When the polarizer layer 203 is such an SyF film, it is possible to reduce a stray magnetic field from the polarizer layer 203 to the oscillation layer 201, and uniformize an external magnetic field distribution that acts on magnetization in the oscillation layer 201. This can reduce the disturbance of the magnetization oscillation in the oscillation layer 201.

Figure 7:
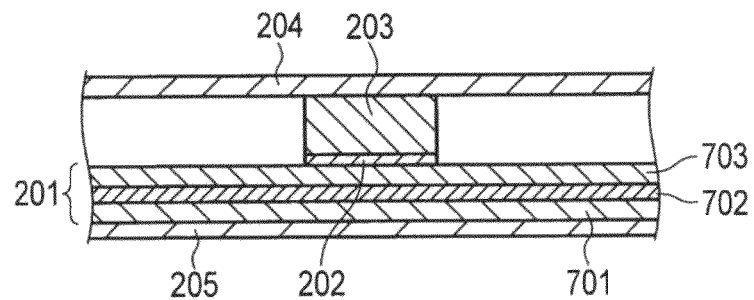
FIG. 7 is a sectional view showing a spin torque oscillator according to an embodiment in which a polarizer layer is a synthetic ferrimagnetic film.

As shown in FIG. 7, the oscillation layer 201 may be an in-plane SyF film formed by a first ferromagnetic layer 701, a nonmagnetic spacer layer 702 stacked on the first ferromagnetic layer 701, and a second ferromagnetic layer 703 stacked on the nonmagnetic spacer layer 702. As the material of the first ferromagnetic layer 701 and second ferromagnetic layer 703, it is possible to use Co, Ni, Fe, and alloys containing at least one of them such as FeNi, CoFe, and CoFeB. As the material of the nonmagnetic spacer layer 702, it is possible to use a nonmagnetic metal that causes antiferromagnetic coupling between the ferromagnetic films when placed between them, e.g., Cr, Ru, or Mo. As an example, the oscillation layer 201 has a film structure of CoFeB(2)/Ru(0.9)/CoFe(2.6). When the oscillation layer 201 is such an SyF film, the two, first and second ferromagnetic layers 701 and 703 contribute to the magnetization oscillation, and this makes it possible to increase the magnitude of the magnetic moment pertaining to oscillation, and increase the magnetization oscillation energy. Consequently, the disturbance of the oscillation resulting from the thermal fluctuation of magnetization can be reduced. Generally, the stability of oscillation increases when the magnetization oscillation energy is higher than the thermal energy.

Figure 8:
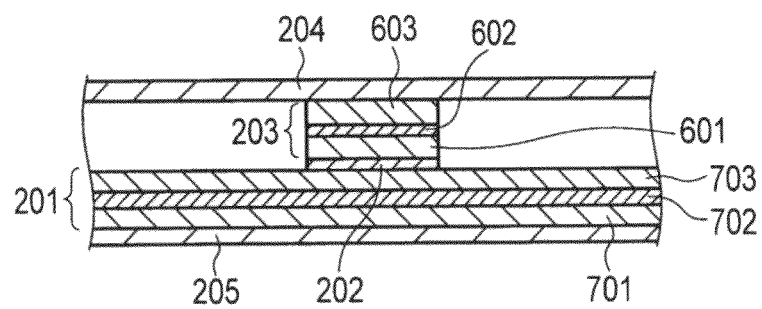
FIG. 8 is a sectional view showing a spin torque oscillator according to an embodiment in which an oscillation layer and polarizer layer are synthetic ferrimagnetic films.

Alternatively, both the oscillation layer 201 and polarizer layer 203 may be in-plane SyF films. More specifically, as shown in FIG. 8, the oscillation layer 201 may be an in-plane SyF film formed by a first ferromagnetic layer 601, a nonmagnetic spacer layer 602 stacked on the first ferromagnetic layer 601, and a second ferromagnetic layer 603 stacked on the nonmagnetic spacer layer 602, and the polarizer layer 203 may be an in-plane SyF film formed by a first ferromagnetic layer 701, a nonmagnetic spacer layer 702 stacked on the first ferromagnetic layer 701, and a second ferromagnetic layer 703 stacked on the nonmagnetic spacer layer 702. When both the oscillation layer 201 and polarizer layer 203 are SyF films, the disturbance of the magnetization oscillation can be reduced. On the other hand, the total thickness of the spin torque oscillator 112 increases, and this may be disadvantageous in decreasing the gap G.

Second Structure Example

Figure 9:
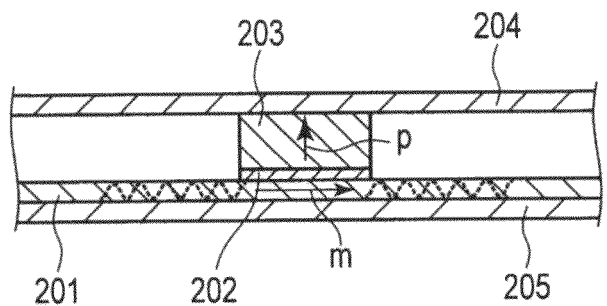
FIG. 9 is a sectional view showing a spin torque oscillator according to an embodiment in which an oscillation layer is an in-plane magnetization film and a polarizer layer is a perpendicular magnetization film.

FIG. 9 schematically shows the second structure example of the spin torque oscillator 112. In the second structure example, as shown in FIG. 9, the oscillation layer 201 is an in-plane magnetization film, and the polarizer layer 203 is a perpendicular magnetization film. As the material of the oscillation layer 201, it is possible to use Co, Ni, Fe, and alloys containing at least one of them, e.g., FeNi, CoFe, CoFeB, and a Heusler alloy such as $Co_2FeAl_xSi_{1-x}$. As the material of the polarizer layer 203, it is possible to use a perpendicular magnetic material such as an FePt/CoPt alloy, Co/Cr alloy, or Co/Pt(Pd) multilayered film.

As the material of the spacer layer 202, it is possible to use a nonmagnetic metal such as Cu, Ag, or Ru, or an insulator such as MgO, ZnO, or AlO. As the material of the foundation layer 205 and cap layer 204, it is possible to use a nonmagnetic metal such as Ti, Cr, Cu, Au, Ta, or Ru, a Ti alloy, or a Cr alloy.

As an example, the spin torque oscillator 112 has a film structure of Ta(2)/[Pt(0.6)/Co(0.45)]$_6$/MgO(0.86)/CoFeB(2)/Ta(2). In this example, the gap G is 13.16 nm. In this case, in a magnetic recording and reproducing apparatus including the recording medium 120 in which information is recorded such that the inter-bit distance is 13.16 nm or more, it is possible to reduce the influence of adjacent recording bits in the bit direction on the spin torque oscillator 112, and reduce the medium noise generated by the inter-bit interference.

When MgO is used as the material of the spacer layer 202, interface perpendicular magnetic anisotropy is generated in the interface between MgO and a ferromagnetic material. By using this interface perpendicular magnetic anisotropy, the polarizer layer 203 formed by Co, Ni, Fe, and alloys containing at least one of them, e.g., FeNi, CoFe, CoFeB, and a Heusler alloy such as $Co_2FeAl_xSi_{1-x}$ has the perpendicular magnetic anisotropy. In this case, the thickness of the polarizer layer 203 is needed to be thin so that the interface perpendicular magnetic anisotropy effectively acts on the layer. For example, when CoFeB(1.6) is stacked as the polarizer layer 203 on MgO(0.86) as the spacer layer 202, the polarizer layer 203 as an in-plane magnetization film can be changed into a perpendicular magnetization film.

As shown in FIG. 6, the polarizer layer 203 may be a perpendicular SyF film formed by a first ferromagnetic layer 601, a nonmagnetic spacer layer 602 stacked on the first ferromagnetic layer 601, and a second ferromagnetic layer 603 stacked on the nonmagnetic spacer layer 602. As the material of the first ferromagnetic layer 601 and second ferromagnetic layer 603, it is possible to use a perpendicular magnetic material such as an FePt/CoPt alloy, Co/Cr alloy, or Co/Pt(Pd) multilayered film. As the material of the nonmagnetic spacer layer 602, it is possible to use a nonmagnetic metal that causes antiferromagnetic coupling between the ferromagnetic films when placed between them, e.g., Cr, Ru, or Mo. As an example, the polarizer layer 203 has a film structure of Pt(0.6)/[Co(1.6)/Pt(0.6)]$_2$/Ru(0.85)/[Pt(0.6)/Co(0.45)]$_6$.

As shown in FIG. 7, the oscillation layer 201 may be an in-plane SyF film formed by a first ferromagnetic layer 701, a nonmagnetic spacer layer 702 stacked on the first ferromagnetic layer 701, and a second ferromagnetic layer 703 stacked on the nonmagnetic spacer layer 702. As the material of the first ferromagnetic layer 701 and second ferromagnetic layer 703, it is possible to use Co, Ni, Fe, and alloys containing at least one of them such as FeNi, CoFe, and CoFeB. As the material of the nonmagnetic spacer layer 702, it is possible to use a nonmagnetic metal that causes antiferromagnetic coupling between the ferromagnetic films when placed between them, e.g., Cr, Ru, or Mo. As an example, the oscillation layer 201 has a film structure of CoFeB(2)/Ru(0.9)/CoFe(2.6).

Alternatively, the oscillation layer 201 may be an in-plane SyF film, and the polarizer layer 203 may be a perpendicular SyF film. More specifically, as shown in FIG. 8, the oscillation layer 201 may be an in-plane SyF film formed by a first ferromagnetic layer 601, a nonmagnetic spacer layer 602 stacked on the first ferromagnetic layer 601, and a second ferromagnetic layer 603 stacked on the nonmagnetic spacer layer 602, and the polarization layer 203 may be a perpendicular SyF film formed by a first ferromagnetic layer 701, a nonmagnetic spacer layer 702 stacked on the first ferromagnetic layer 701, and a second ferromagnetic layer 703 stacked on the nonmagnetic spacer layer 702.

Third Structure Example

Figure 10:
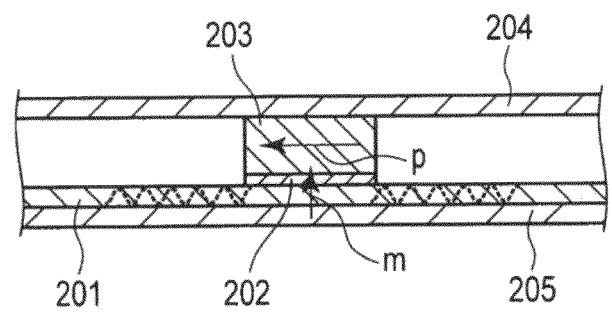
FIG. 10 is a sectional view showing a spin torque oscillator according to an embodiment in which an oscillation layer is a perpendicular magnetization film and a polarizer layer is an in-plane magnetization film.

FIG. 10 schematically shows the third structure example of the spin torque oscillator 112. In the third structure example, as shown in FIG. 10, the oscillation layer 201 is a perpendicular magnetization film, and the polarizer layer 203 is an in-plane magnetization film. As the material of the oscillation layer 201, it is possible to use a perpendicular magnetic material such as an FePt/CoPt alloy, Co/Cr alloy, or Co/Pt(Pd) multilayered film. As the material of the polarizer layer 203, it is possible to use Co, Ni, Fe, and alloys containing at least one of them, e.g., FeNi, CoFe, CoFeB, and a Heusler alloy such as $Co_2FeAl_xSi_{1-x}$.

As the material of the spacer layer 202, it is possible to use a nonmagnetic metal such as Cu, Ag, or Ru, or an insulator such as MgO, ZnO, or AlO. As the material of the foundation layer 205 and cap layer 204, it is possible to use a nonmagnetic metal such as Ti, Cr, Cu, Au, Ta, or Ru, a Ti alloy, or a Cr alloy.

As an example, the spin torque oscillator 112 has a film structure of $Ta(2)/CoFeB(2)/MgO(0.86)/[Pt(0.6)/Co(0.45)]_6/Ta(2)$. In this example, the gap G is 13.16 nm. In this case, in a magnetic recording and reproducing apparatus including the recording medium 120 in which information is recorded such that the inter-bit distance is 13.16 nm or more, it is possible to reduce the influence of adjacent recording bits in the bit direction on the spin torque oscillator 112, and reduce the medium noise generated by the inter-bit interference.

When MgO is used as the material of the spacer layer 202, interface perpendicular magnetic anisotropy is generated in the interface between MgO and a ferromagnetic material. By using this interface perpendicular magnetic anisotropy, the oscillation layer 201 formed by Co, Ni, Fe, and alloys containing at least one of them, e.g., FeNi, CoFe, CoFeB, and a Heusler alloy such as $Co_2FeAl_xSi_{1-x}$ has the perpendicular magnetic anisotropy. In this case, the thickness of the oscillation layer 201 is needed to be thin so that the interface perpendicular magnetic anisotropy effectively acts on the layer. For example, the oscillation layer 201 can be formed as a perpendicular magnetization film by stacking CoFeB(1.6) as the oscillation layer 201 on MgO(0.86) as the spacer layer 202.

As shown in FIG. 6, the polarizer layer 203 may be an in-plane SyF film formed by a first ferromagnetic layer 601, a nonmagnetic spacer layer 602 stacked on the first ferromagnetic layer 601, and a second ferromagnetic layer 603 stacked on the nonmagnetic spacer layer 602. As the material of the first ferromagnetic layer 601 and second ferromagnetic layer 603, it is possible to use Co, Ni, Fe, and alloys containing at least one of them such as FeNi, CoFe, and CoFeB. As the material of the nonmagnetic spacer layer 602, it is possible to use a nonmagnetic metal that causes antiferromagnetic coupling between the ferromagnetic films when placed between them, e.g., Cr, Ru, or Mo. As an example, the polarizer layer 203 has a film structure of $CoFeB(2)/Ru(0.9)/CoFeB(2.6)$.

As shown in FIG. 7, the oscillation layer 201 may be a perpendicular SyF film formed by a first ferromagnetic layer 701, a nonmagnetic spacer layer 702 stacked on the first ferromagnetic layer 701, and a second ferromagnetic layer 703 stacked on the nonmagnetic spacer layer 702. As the material of the first ferromagnetic layer 701 and second ferromagnetic layer 703, it is possible to use a perpendicular magnetic material such as an FePt/CoPt alloy, Co/Cr alloy, or Co/Pt(Pd) multilayered film. As the material of the nonmagnetic spacer layer 702, it is possible to use a nonmagnetic metal that causes antiferromagnetic coupling between the ferromagnetic films when placed between them, e.g., Cr, Ru, or Mo. As an example, the oscillation layer 201 has a film structure of $Pt(0.6)/[Co(1.6)/Pt(0.6)]_2/Ru(0.85)/[Pt(0.6)/Co(0.45)]_6$.

Alternatively, the oscillation layer 201 may be a perpendicular SyF film, and the polarizer layer 203 may be an in-plane SyF film. More specifically, as shown in FIG. 8, the oscillation layer 201 may be a perpendicular SyF film formed by a first ferromagnetic layer 601, a nonmagnetic spacer layer 602 stacked on the first ferromagnetic layer 601, and a second ferromagnetic layer 603 stacked on the nonmagnetic spacer layer 602, and the polarizer layer 203 may be an in-plane SyF film formed by a first ferromagnetic layer 701, a nonmagnetic spacer layer 702 stacked on the first ferromagnetic layer 701, and a second ferromagnetic layer 703 stacked on the nonmagnetic spacer layer 702.

Fourth Structure Example

Figure 11:
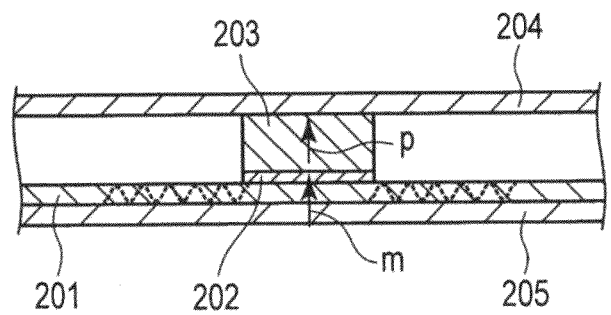
FIG. 11 is a sectional view showing a spin torque oscillator according to an embodiment in which an oscillation layer and polarizer layer are perpendicular magnetization films.

FIG. 11 schematically shows the fourth structure example of a spin torque oscillator 112. In the fourth structure example, as shown in FIG. 11, both the oscillation layer 201 and polarizer layer 203 are perpendicular magnetization films. As the material of the oscillation layer 201 and polarizer layer 203, it is possible to use a perpendicular magnetic material such as an FePt/CoPt alloy, Co/Cr alloy, or Co/Pt(Pd) multilayered film.

As the material of the spacer layer 202, it is possible to use a nonmagnetic metal such as Cu, Ag, or Ru, or an insulator such as MgO, ZnO, or AlO. As the material of the foundation layer 205 and cap layer 204, it is possible to use a nonmagnetic metal such as Ti, Cr, Cu, Au, Ta, or Ru, a Ti alloy, or a Cr alloy.

As an example, the spin torque oscillator 112 has a film structure of $Ta(2)/Pt(0.6)/[Pt(0.6)/Co(0.45)]_6/Ru(0.86)/[Co(1.6)/Pt(0.6)]_2/Ta(2)$. In this example, the gap G is 16.16 nm. In this case, in a magnetic recording and reproducing apparatus including the recording medium 120 in which information is recorded such that the inter-bit distance is 16.16 nm or more, it is possible to reduce the influence of adjacent recording bits in the bit direction on the spin torque oscillator 112, and reduce the medium noise generated by the inter-bit interference.

When MgO is used as the material of the spacer layer 202, interface perpendicular magnetic anisotropy is generated in the interface between MgO and a ferromagnetic material. By using this interface perpendicular magnetic anisotropy, the oscillation layer 201 and polarizer layer 203 as in-plane magnetization films formed by Co, Ni, Fe, and alloys containing at least one of them, e.g., FeNi, CoFe, CoFeB, and a Heusler alloy such as $Co_2FeAl_xSi_{1-x}$ has the perpendicular magnetic anisotropy. In this case, the thicknesses of the oscillation layer 201 and polarizer layer 203 is needed to be thin so that the interface perpendicular magnetic anisotropy effectively acts on the layer. For example, the oscillation layer 201 and polarizer layer 203 can be formed as perpendicular magnetization films by stacking CoFeB(1.6) as the oscillation layer 201 and polarizer layer 203 above and below MgO(0.86) as the spacer layer 202.

As shown in FIG. 6, the polarizer layer 203 may be a perpendicular SyF film formed by a first ferromagnetic layer 601, a nonmagnetic spacer layer 602 stacked on the first ferromagnetic layer 601, and a second ferromagnetic layer 603 stacked on the nonmagnetic spacer layer 602. As the material of the first ferromagnetic layer 601 and second ferromagnetic layer 603, it is possible to use a perpendicular magnetic material such as an FePt/CoPt alloy, Co/Cr alloy, or Co/Pt(Pd) multilayered film. As the material of the nonmagnetic spacer layer 602, it is possible to use a nonmagnetic metal that causes antiferromagnetic coupling between the ferromagnetic films when placed between them, e.g., Cr, Ru, or Mo. As an example, the polarizer layer 203 has a film structure of $Pt(0.6)/[Co(1.6)/Pt(0.6)]_2/Ru(0.85)/[Pt(0.6)/Co(0.45)]_6$.

As shown in FIG. 7, the oscillation layer 201 may be a perpendicular SyF film formed by a first ferromagnetic layer 701, a nonmagnetic spacer layer 702 stacked on the first ferromagnetic layer 701, and a second ferromagnetic layer 703 stacked on the nonmagnetic spacer layer 702. As the material of the first ferromagnetic layer 701 and second ferromagnetic layer 703, it is possible to use a perpendicular magnetic material such as an FePt/CoPt alloy, Co/Cr alloy, or Co/Pt(Pd) multilayered film. As the material of the nonmagnetic spacer layer 702, it is possible to use a nonmagnetic metal that causes antiferromagnetic coupling between the ferromagnetic films when placed between them, e.g., Cr, Ru, or Mo. As an example, the oscillation layer 201 has a film structure of $Pt(0.6)/[Co(1.6)/Pt(0.6)]_2/Ru(0.85)/[Pt(0.6)/Co(0.45)]_6$.

Alternatively, both the oscillation layer 201 and polarizer layer 203 may be perpendicular SyF films. More specifically, as shown in FIG. 8, the oscillation layer 201 may be a perpendicular SyF film formed by a first ferromagnetic layer 601, a nonmagnetic spacer layer 602 stacked on the first ferromagnetic layer 601, and a second ferromagnetic layer 603 stacked on the nonmagnetic spacer layer 602, and the polarizer layer 203 may be a perpendicular SyF film formed by a first ferromagnetic layer 701, a nonmagnetic spacer layer 702 stacked on the first ferromagnetic layer 701, and a second ferromagnetic layer 703 stacked on the nonmagnetic spacer layer 702.

As described above, the magnetic recording and reproducing apparatus according to the second embodiment uses the STO reproducing head in which the gap between the shield layers sandwiching the spin torque oscillator is equal to or smaller than the inter-bit distance. This makes it possible to reduce the medium noise generated by the inter-bit interference. Consequently, the SN ratio of a reproduction signal can be increased.

Third Embodiment

Figure 12:
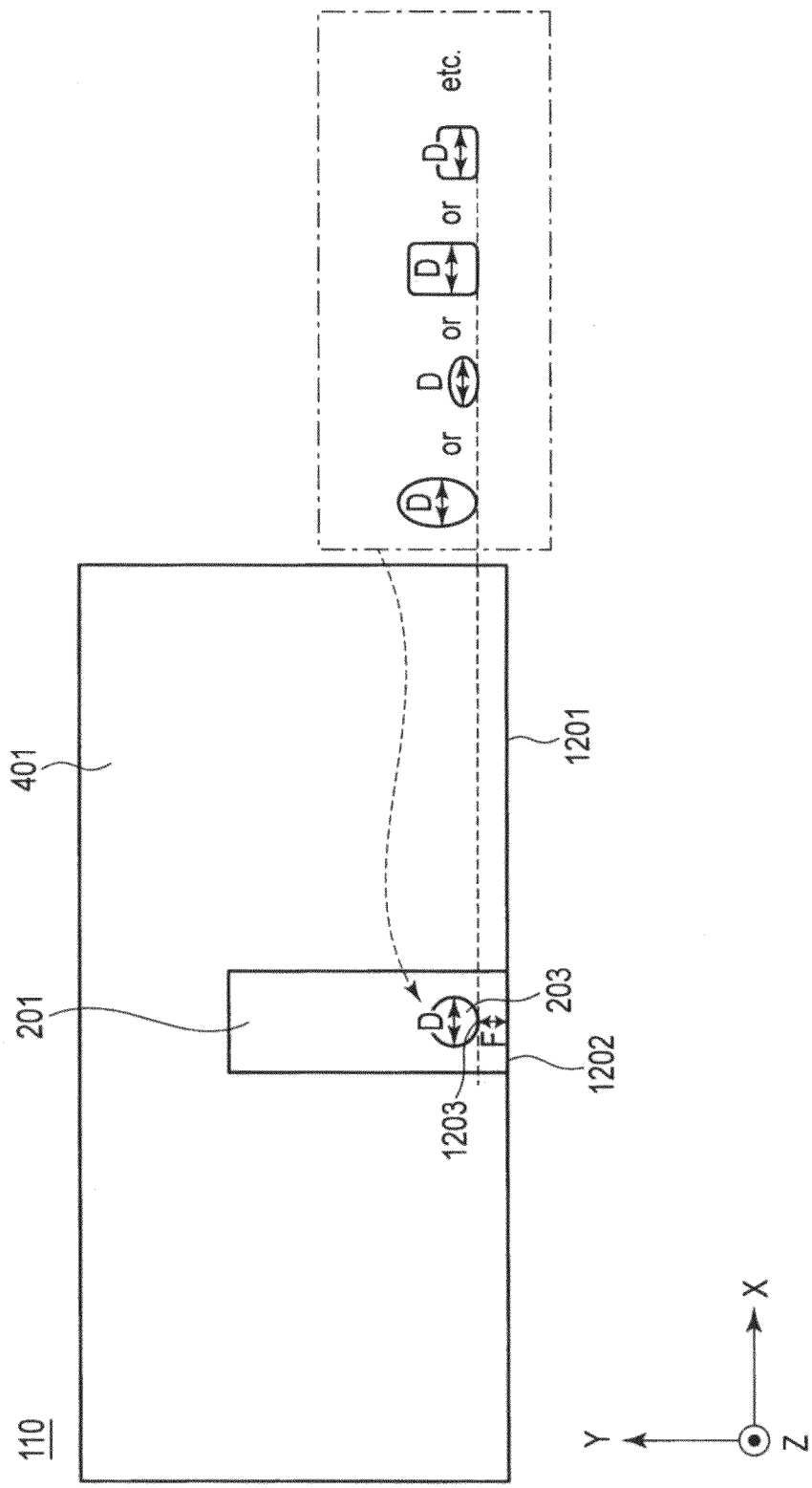
FIG. 12 is a view schematically showing a spin torque oscillator reproducing head according to the third embodiment.

FIG. 12 schematically shows a structure of a spin torque oscillator 112 according to the third embodiment viewed from the bit direction. As shown in FIG. 12, the spin torque oscillator 112 has an air bearing surface (ABS) 1201 as a surface facing the surface of a recording medium 120. An oscillation layer 201 has a medium facing surface 1202 facing the surface of the recording medium 120. The ABS 1201 includes the medium facing surface 1202. Furthermore, a polarizer layer 203 has a medium facing surface 1203 facing the surface of the recording medium 120. In this embodiment, a distance F between the medium facing surface 1203 of the polarizer layer 203 and the ABS 1201 (more specifically, the medium facing surface 1202 of the oscillation layer 201) is larger than half of a cross-track direction width D of the polarizer layer 203. That is, the spin torque oscillator 112 is so designed and processed to satisfy:

$$F > D/2 \qquad (3)$$

When inequality (3) is satisfied, the reflection of a spin wave, which results from a large-amplitude magnetization dynamics excited in the oscillation layer 201, on the ABS side of the oscillation layer 201 is suppressed. Accordingly, the large-amplitude magnetization dynamics immediately below the polarizer layer 203 and a spacer layer 202 is hardly disturbed. As a consequence, the spin torque oscillator 112 stably oscillates, and a reproduction signal having a high Q value can be extracted from the spin torque oscillator 112.

The reason why the reflection of the spin wave on the ABS side of the oscillation layer 201 which results from the large-amplitude magnetization dynamics excited in the oscillation layer 201 is suppressed when F>D/2 is the same as the reason described earlier in relation to inequality (1). That is, in the half-pillar type spin torque oscillator 112, the large-amplitude magnetization dynamics excited by an electric current locally exists within the range of a width of 2D immediately below the polarizer layer 203 and spacer layer 202. When F>D/2, only a very small fraction of the magnetization dynamics can reach the medium facing surface 1202 of the oscillation layer 201, and the large-amplitude magnetization dynamics immediately below the polarizer layer 203 and spacer layer 202 is almost not disturbed.

The patterning shape of the polarizer layer 203 is not limited to a circular pillar, and may be an elliptical pillar, a square pillar having rounded corners, or the like.

The relationship between the oscillation of the spin torque oscillator 112 and an external magnetic field will be explained.

Generally, the oscillation of the spin torque oscillator 112 is sensitive to magnetic parameters such as an electric current, external magnetic field, and magnetic material, and it is known well to engineers in the field of spin-transfer technologies that a stable oscillation mode or turbulence-like unstable mode appears depending on the values of these parameters. Therefore, it is not always possible to obtain stable oscillation under any conditions.

Accordingly, a structure example for applying an external magnetic field that acts on the spin torque oscillator 112 in order to obtain stable oscillation will be described below. In this embodiment, an external magnetic field to be applied to the spin torque oscillator 112 is generated by a hard bias film like those formed in the conventional MR element reproducing heads. As this hard bias film, a ferromagnetic material having a high coercive force such as a CoPt or CoPtCr alloy is used.

Figure 13:
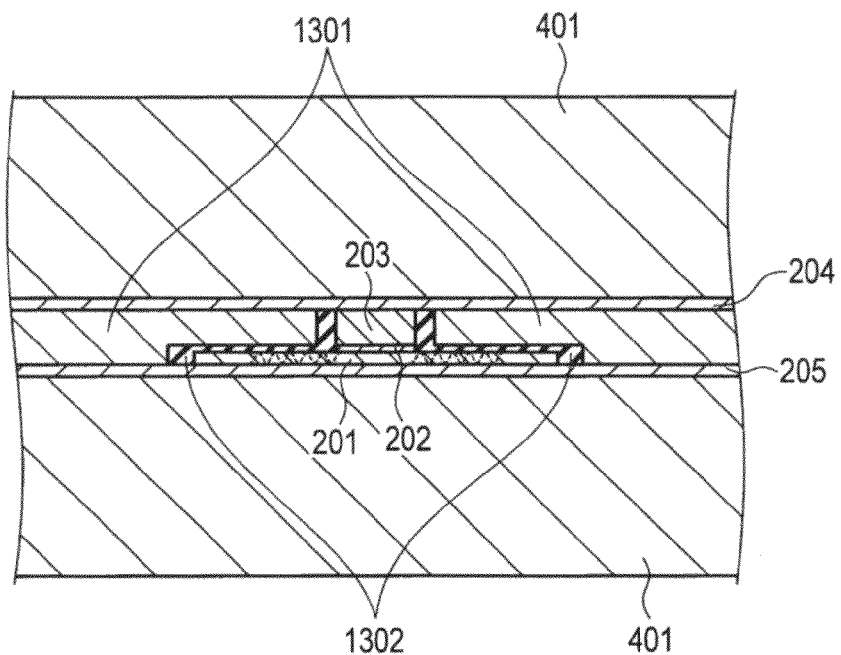
FIG. 13 is a view showing an example in which a hard bias film is formed in a spin torque oscillator reproducing head according to an embodiment.

FIG. 13 shows an example of the arrangement of hard bias films 1301. The hard bias films 1301 are arranged on the two sides of the polarizer layer 203 in the cross-track direction. For example, when the hard bias films 1301 are magnetized in the cross-track direction, the polarizer layer 203 can be pinned (albeit incompletely) in the cross-track direction by the hard bias film 1301, so the fluctuation in magnetization p of the polarizer layer 203 can be suppressed.

Also, the magnetic field from the hard bias film 1301 acts on the oscillation layer 201 as well, so stable oscillation can be obtained while an electric current is supplied, by appropriately adjusting the distance between the hard bias film 1301 and polarizer layer 203, the distance between the hard bias film 1301 and spacer layer 202, and the distance between the hard bias film 1301 and oscillation layer 201. Typically, an insulating layer 1302 is formed between the hard bias film 1301 and the oscillation layer 201, spacer layer 202, and polarizer layer 203.

Figure 14:
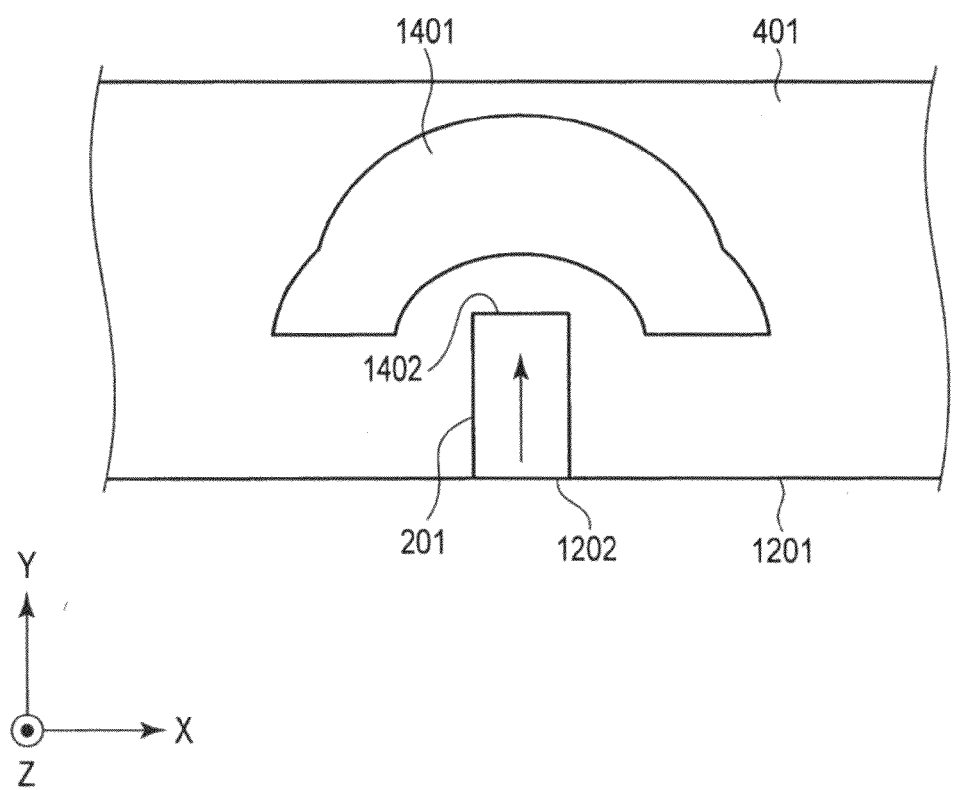
FIG. 14 is a view showing another example in which a hard bias film is formed in the spin torque oscillator reproducing head according to the embodiment.

FIG. 14 shows another example of the arrangement of a hard bias film 1401. In this example, the hard bias film 1401 is arranged opposite to a side surface 1402 of the oscillation layer 201 facing the ABS 1201 (more specifically, the medium facing surface 1202 of the oscillation layer 201). Assume that the recording medium 120 is a perpendicular magnetic recording medium. For example, when the hard bias film 1401 is magnetized in a direction perpendicular to the medium surface (i.e., in the Y direction), a Y-direction magnetic field acts on the oscillation layer 201. In this state, the oscillation central axis of the oscillation layer 201 becomes parallel to the magnetic field from the recording medium 120, and a phase shift of a high-frequency output from the spin torque oscillator 112 is efficiently performed by the medium magnetic field in this case. Accordingly, this arrangement is suited to a phase shift detection type STO reproducing head.

Also, the magnetic field of the hard bias film 1401 acts on the polarizer layer 203 as well. Therefore, the magnetization of the polarizer layer 203 can be pinned (albeit incompletely), so the fluctuation in magnetization p can be suppressed. Consequently, stable oscillation can be obtained.

As described above, the magnetic recording and reproducing apparatus according to the third embodiment includes the spin torque oscillator processed such that the distance between the medium facing surface of the polarizer layer and the medium facing surface of the oscillation layer is larger than half of the cross-track direction width of the polarizer layer. This makes it possible to obtain stable oscillation. As a consequence, the SN ratio of a reproduction signal can be increased.

The magnetic recording and reproducing apparatus according to at least one of the above-described embodiments includes the spin torque oscillator processed such that the cross-track direction width of the oscillation layer is larger than double the cross-track direction width of the polarizer layer, and the cross-track direction width of the polarizer layer is smaller than the inter-track distance of the recording medium. This makes it possible to obtain stable oscillation, and reduce the medium noise. Consequently, the SN ratio of a reproduction signal can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording and reproducing apparatus comprising:
   a recording medium including a plurality of concentric circular tracks; and
   a spin torque oscillator reproducing head which includes a spin torque oscillator and reproduces information from the recording medium using the spin torque oscillator, the spin torque oscillator including an oscillation layer with a first cross-track direction width, a polarizer layer with a second cross-track direction width, and a spacer layer provided between the oscillation layer and the polarizer layer,
   wherein the first cross-track direction width is larger than double the second cross-track direction width, and the second cross-track direction width is smaller than an inter-track distance.

2. The apparatus according to claim 1, further comprising a pair of shield layers between which the spin torque oscillator is provided, wherein a gap between the pair of shield layers is not more than an inter-bit distance of the recording medium.

3. The apparatus according to claim 1, wherein the oscillation layer has a first medium facing surface facing the recording medium, the polarizer layer has a second medium facing surface facing the recording medium, and a distance between the first medium facing surface and the second medium facing surface is larger than a half of the second cross-track direction width.

4. The apparatus according to claim 1, further comprising hard bias films provided on both sides of the polarizer layer in a cross-track direction.

5. The apparatus according to claim 1, further comprising a hard bias film provided opposite to a side surface of the oscillation layer.

6. The apparatus according to claim 1, wherein the oscillation layer is an in-plane magnetization film, and the polarizer layer is an in-plane magnetization film.

7. The apparatus according to claim 1, wherein the oscillation layer is an in-plane magnetization film, and the polarizer layer is a perpendicular magnetization film.

8. The apparatus according to claim 1, wherein the oscillation layer is a perpendicular magnetization film, and the polarizer layer is an in-plane magnetization film.

9. The apparatus according to claim 1, wherein the oscillation layer is a perpendicular magnetization film, and the polarizer layer is a perpendicular magnetization film.

10. The apparatus according to claim 1, wherein the oscillation layer is a synthetic ferrimagnetic film.

11. The apparatus according to claim 1, wherein the polarizer layer is a synthetic ferrimagnetic film.

12. The apparatus according to claim 1, wherein the first cross-track direction width is a dimension of the oscillation layer in a cross-track direction in a state in which the spin torque oscillator is located opposite to the recording medium in order to reproduce information, the second cross-track direction width is a dimension of the polarizer layer in the cross-track direction in the state, and the inter-track distance is a distance between centers of two tracks adjacent to each other in the cross-track direction.

13. The apparatus according to claim 12, wherein the cross-track direction is a radial direction of the concentric circular tracks.

* * * * *